Jan. 27, 1931.  F. W. MORSE  1,790,058
TIDE AND WAVE MOTOR
Filed July 17, 1929   2 Sheets-Sheet 1

INVENTOR
Frank W. Morse.
BY
ATTORNEY

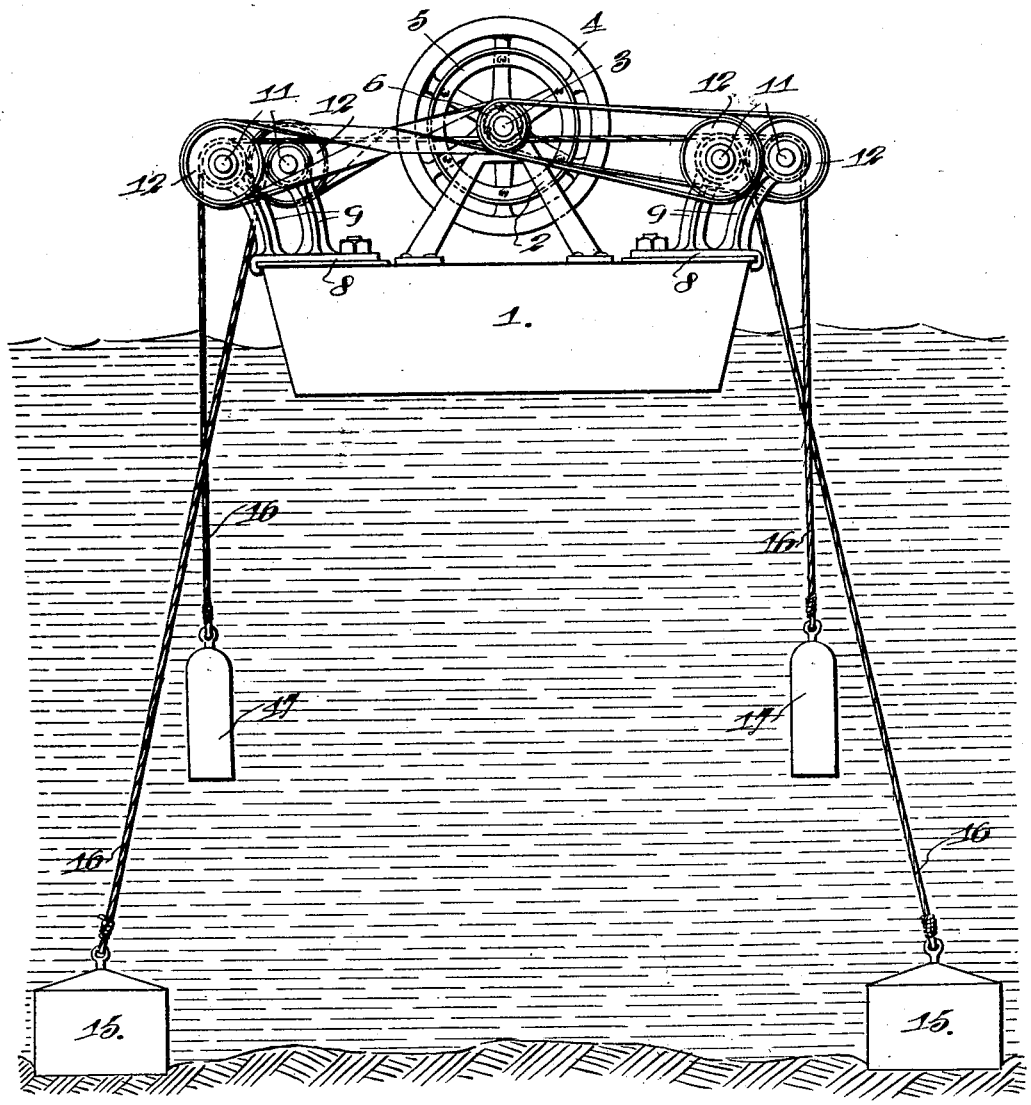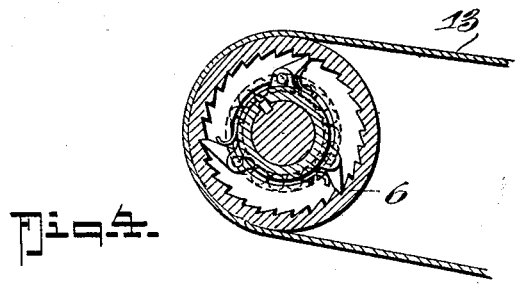

Patented Jan. 27, 1931

1,790,058

UNITED STATES PATENT OFFICE

FRANK W. MORSE, OF SAN FERNANDO, CALIFORNIA

TIDE AND WAVE MOTOR

Application filed July 17, 1929. Serial No. 378,951.

The invention primarily has for its object to provide a novel means for efficiently harnessing the kinetic energy incident to the rise and fall of tides and the variations of undulatory motions occasioned by ocean waves and swells and for applying that energy to useful and practical work.

In its more detailed nature the invention resides in the provision of a free anchored float of considerable size and having thereon a plurality of motor units including clutches, cables wound over the clutches and attached to the anchors and counterbalance weights so arranged relatively to each other, the float and to a single shaft to which rotation is imparted in one direction only, that every motion of which the float is capable under action of the element in which it is anchored will serve to impart rotation to the said shaft in a manner assuring steady and continuous rotation of the said shaft.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings, in which:—

Figure 1:
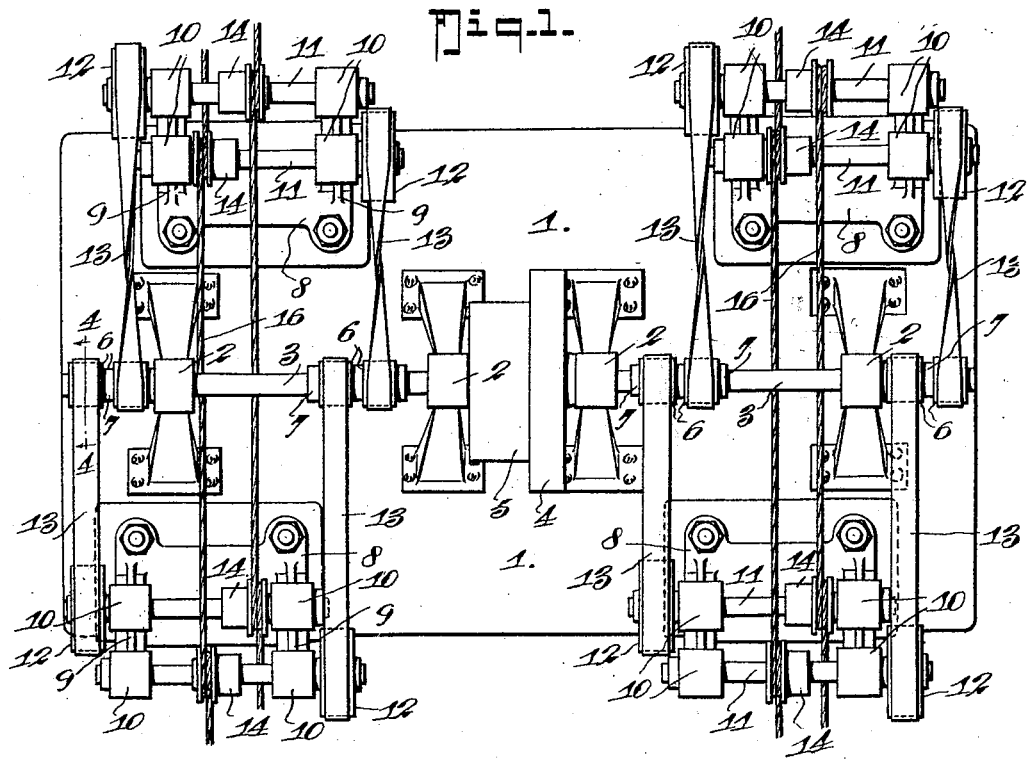
Figure 2:
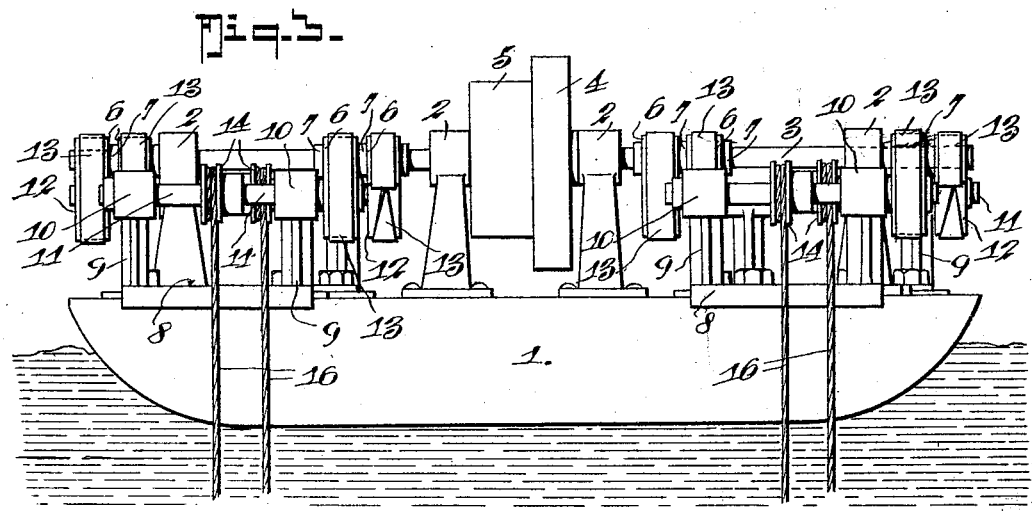

Figure 1 is a plan view.
Figure 2 is an end elevation.
Figure 3 is a side elevation.
Figure 4 is a detail vertical section taken on the line 4—4 on Figure 1.

In the drawings in which like numerals of reference indicate like parts in all of the figures, 1 designates a float which is of a length sufficient to reach both the crest and trough of a usual ocean wave or swell and which has mounted thereon, in suitable bearings 2, a main or driven shaft to which power is to be applied and from which power may be distributed for use. The shaft 3 may be provided with a fly wheel 4 and a suitable power take-off pulley 5 or its equivalent. The shaft 3 is also equipped with eight loose clutches 6 which may be in the nature of spring clutches or any other suitable type of clutch through the medium of which rotation may be imparted to the shaft 3 in one direction only, the clutches being free to rotate relatively to the said shaft in the opposite direction. Collars 7 may be provided to hold the clutches against longitudinal movement on the shaft.

A motor unit is mounted at each corner of the float and each said unit comprises a base 8 secured upon the float and provided with four spaced bearing standards 9, each carrying a bearing head 10. Each longitudinally aligning pair of bearing heads 10 rotatably carries a shaft 11 and on each said shaft is mounted a fly wheel pulley 12. The pulleys of the shafts of adjacent pairs are mounted at the reverse ends of the shafts as illustrated in Figure 1 of the drawings. The transmission belt 13 passes over each pulley 12 and over an associated one of the main shaft clutches 6 so that rotation imparted to the pulleys 12 will be transmitted to the main shaft 3.

Each shaft 11 carries a pair of clutches 14 which are similar in construction to those mounted on the shaft 3. An anchor 15 is provided at each corner of the float, the said anchors being adapted to rest on the ocean bed when the invention is in use for the purpose of anchoring the float on location in a manner, however, allowing movement of the said float in all directions suitable for applying power. Each anchor is secured to a cable or chain 16 which passes around one of the clutches on an associated shaft 11 and then over and around a clutch on an associated one of the opposite pair of shafts and then down into the water where it is attached to a weight 17 sufficient to impart rotation to the main shaft 3 whenever the said weight is allowed to descend in the water.

It will be understood that the clutches 14 of associated shafts 11 over which a respective cable or chain 16 passes are active in reverse directions, one of them having its associated transmission belt 13 crossed, so that one of said shafts will apply power due to an upward movement of the float while the other will apply power due to a downward movement of the float and under action of the associated weight 17.

By employment of the equipment above described, each time a portion of the float is lifted by tide, wave, or swell action one or more of the clutches will be actuated to impart rotation to the shaft on which it is carried and therethrough to the main shaft 3 and every return movement of that same portion of the float will cause one or more of the weights 17 to impart similar rotation to the shaft 3, it being understood that the employment of the clutches on the shaft 3 enables relative movement of the said clutches and the shaft in such a manner that rotation will be imparted to that shaft constantly and evenly so long as any motion whatever is being imparted to the float by movements of the water. It will be understood that rotative impulses are imparted not only by upward movements of the float but also during retractive or lowering movements of the float, such latter impulses being imparted or occasioned by falling of the weights 17 which occur whenever the portion of the float to which it is attached is being lowered.

In this manner rotation is imparted to the shaft uniformly by varying and different movements of the float at its respective corners, for example certain of the corners may be moved upwardly and others moved downwardly, yet all such movements will serve at the same time to impart rotation to the shaft 3. In this connection the building of the float of a length for reaching both the swell and trough of waves is important since it facilitates active movement of the float for transmitting rotation at all times.

It will be readily observed that any motion of the float will operate the main shaft; a swing of the float by the shifting of the wind, the roll of a wave, a swell, a rise or fall of the wave or tide will keep the main shaft in constant motion and in locations where extreme tides are experienced, as in the Bay of Fundy, a most satisfactory rotation of the main shaft will be assured.

From the foregoing description, taken in connection with the accompanying drawings, it is thought that the novel details of construction, the manner of use and the advantages of my invention will be readily apparent to those skilled in the art to which it relates.

What I claim is:

1. In a device of the character described, a float, a driven shaft on the float, bearings on which the driven shaft is rotatably mounted, a pair of uni-directional clutch drums on the driven shaft, a pair of driver shafts, a driver pulley on each driver shaft, power transmission connections between the driver shaft pulleys and the driven shaft clutch drums, an anchor associated with each driver shaft, a pair of uni-directional clutch drums on each driver shaft, a cable attached to each anchor, each said cable having a weight attached to its other end and being wound round one clutch drum of each driver shaft for the purpose described.

2. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, and a weight attached to each such extended cable end.

3. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, and a weight attached to each such extended cable end, said float being of a length to enable it to ride the trough and crest of a wave at one and the same time.

4. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, and a weight attached to each such extended cable end, all of said shafts being arranged in parallel relation and extending longitudinally of the float.

5. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, and a weight attached to each such extended cable end, all of said shafts being arranged in parallel relation and extending longitudinally of the float, said float being of a length to enable it to ride the trough and crest of a wave at one and the same time.

6. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, and a weight attached to each such extended cable end, each corner mounted pair of driver shafts being mounted in bearings carried by a common bearing hanger mounted on the respective float corner.

7. A tide and wave motor comprising a float, a driven shaft rotatable in bearings mounted on the float, eight uni-directional clutch drums mounted on the driven shaft, a pair of driver shafts mounted at each corner of the float one of each corner pair being cooperatively associated with one of the pair at the opposite side but same end of the float, a driver pulley on each driver shaft, power transmission connections between the driver shaft pulleys and the driven shaft clutch drums, an anchor associated with each cooperatively associated pair of driver shafts and having a cable attached thereto and wound over the clutch drums of the said cooperatively associated pair of driver shafts and from thence extending downward into the water, a weight attached to each such extended cable end, each corner mounted pair of driver shafts being mounted in bearings carried by a common bearing hanger mounted on the respective float corner, all of said shafts being arranged in parallel relation and extending longitudinally of the float, and said float being of a length to enable it to ride the trough and crest of a wave at one and the same time.

8. In a swell or wave motor, a float having four corners, a motor unit located at each of the four corners on the float, a main driven shaft on the float common to all of said motor units, said motor units each including power shafts, pulleys on said power shafts, one-way clutches connecting said pulleys operatively to their power shafts, cables, one end of each of which cables is anchored to the bottom and the other end of each of which cables carrying a weight, each of said cables being passed around a pulley on one power shaft of each of a pair of opposite motor units whereby movement of the float will effect rotation of said power shafts uni-directionally, and power transmitting connections between said power shafts and said main driven shaft.

9. In a swell or wave motor, a float having four corners, a motor unit located at each of the four corners on the float, a main driven shaft on the float common to all of said motor shafts, said motor units each including power shafts, pulleys on said power shafts, one-way clutches connecting said pulleys cooperatively to their power shafts, cables, one end of each of which cables is anchored to the bottom and the other end of each of which cables carrying a weight, each of said cables being passed around a pulley on one power shaft of each of a pair of opposite motor units whereby movement of the float will effect rotation of said power shafts uni-directionally, and power transmitting connections between said power shafts and said main driven shaft, said power transmitting connections including one-way driving clutches on the main driven shaft.

10. In a swell or wave motor, a float, anchors at each corner of the float, a motor unit located on each corner of the float, each motor unit including a pair of power shafts, a pulley on each power shaft and a one-way clutch connection between each pulley and its power shaft, cables, one end of each of which is connected to an anchor at one corner and passes around a pulley on a power shaft of the adjacent motor unit and across the float to and around a pulley on a power shaft of the motor unit at the opposite corner, and a weight on the free end of each cable, a main driven shaft mounted on the float, and power transmitting connections between each of said power shafts and said main driven shaft and including one-way clutches.

FRANK W. MORSE.